(12) United States Patent
Choi et al.

(10) Patent No.: US 8,145,586 B2
(45) Date of Patent: Mar. 27, 2012

(54) METHOD AND APPARATUS FOR DIGITAL FORENSICS

(75) Inventors: Young Han Choi, Daejeon (KR); Tae Ghyoon Kim, Daejeon (KR); Hyung Geun Oh, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 788 days.

(21) Appl. No.: 12/252,869

(22) Filed: Oct. 16, 2008

(65) Prior Publication Data

US 2009/0299935 A1 Dec. 3, 2009

(30) Foreign Application Priority Data

Jun. 2, 2008 (KR) .................. 10-2008-0051716

(51) Int. Cl.
*G06F 17/00* (2006.01)
*G06N 5/02* (2006.01)
(52) U.S. Cl. ........................................ 706/46
(58) Field of Classification Search .............. 706/46
See application file for complete search history.

(56) References Cited

U.S. PATENT DOCUMENTS

| | | | |
|---|---|---|---|
| 7,587,601 B2 * | 9/2009 | Levy et al. ............... | 713/176 |
| 7,616,237 B2 * | 11/2009 | Fridrich et al. ............... | 348/241 |
| 7,787,030 B2 * | 8/2010 | Fridrich et al. ............... | 348/241 |
| 7,865,493 B2 * | 1/2011 | Kim et al. ............... | 707/706 |
| 7,940,989 B2 * | 5/2011 | Shi et al. ............... | 382/232 |
| 7,941,386 B2 * | 5/2011 | Bousquet et al. ............... | 706/45 |
| 8,014,976 B2 * | 9/2011 | Carpenter et al. ............... | 702/186 |
| 2008/0065811 A1 | 3/2008 | Jahangiri | |
| 2009/0154809 A1 * | 6/2009 | Fridrich et al. ............... | 382/181 |

FOREIGN PATENT DOCUMENTS

| | | |
|---|---|---|
| JP | 2008-097484 A | 4/2008 |
| KR | 1020060043333 A | 5/2006 |
| KR | 2007-0068162 A | 6/2007 |

OTHER PUBLICATIONS

Unsupervised classification of digital images using enhanced sensor pattern noise, Chang-Tsun Li; Circuits and Systems (ISCAS), Proceedings of 2010 IEEE International Symposium on Digital Object Identifier: 10.1109/ISCAS.2010.5537850 Publication Year: 2010 , pp. 3429-3432.*
Scanner Identification Using Feature-Based Processing and Analysis, Khanna, N.; Mikkilineni, A.K.; Delp, E.J.; Information Forensics and Security, IEEE Transactions on vol. 4 , Issue: 1 Digital Object Identifier: 10.1109/TIFS.2008.2009604 Publication Year: 2009 , pp. 123-139.*

(Continued)

*Primary Examiner* — Michael B Holmes
(74) *Attorney, Agent, or Firm* — Ladas & Parry LLP (57) ABSTRACT

A method and apparatus for digital forensics are provided. The apparatus for digital forensics includes a page file extractor for extracting a page file stored in a target storage medium, a stored-page feature extractor for extracting features of pages stored in the extracted page file, a page classifier for comparing the extracted features of the pages with at least one predetermined classification criterion and classifying the pages according to the comparison results, and a digital forensics unit for performing digital forensics according to the classified pages. According to the method and apparatus, it is possible to perform digital forensics using only information of a page file.

15 Claims, 5 Drawing Sheets

OTHER PUBLICATIONS

Learning from interpolated images using neural networks for digital forensics, Yizhen Huang; Na Fan; Computer Vision and Pattern Recognition (CVPR), 2010 IEEE Conference on Digital Object Identifier: 10.1109/CVPR.2010.5540215 Publication Year: 2010 , pp. 177-182.*

Adaptive feature selection for digital camera source identification, Min-Jen Tsai; Cheng-Sheng Wang; Circuits and Systems, 2008. ISCAS 2008. IEEE International Symposium on Digital Object Identifier: 10.1109/ISCAS.2008.4541442 Publication Year: 2008 , pp. 412-415.*

Seok-Hee Lee, et. al.; "A Study of Memory Information Collection and Analysis in a view of Digital Forensic in Window System", Korea Information Security Institute Academic Journal, vol. 16, No. 1, 2006, 02, pp. 87-96.

* cited by examiner

METHOD AND APPARATUS FOR DIGITAL FORENSICS

CROSS-REFERENCE TO RELATED APPLICATION

This application claims priority to and the benefit of Korean Patent Application No. 2008-51716, filed Jun. 2, 2008, the disclosure of which is incorporated herein by reference in its entirety.

BACKGROUND

1. Field of the Invention

The present invention relates to a method and apparatus for digital forensics, and more particularly, to a method and apparatus for digital forensics capable of obtaining detailed information using a feature of data used as a virtual memory in a computing environment.

2. Discussion of Related Art

Digital forensics is the field of finding important evidence using computer-generated information in criminal investigations. With the development of information technology, most information is being digitized. Thus, in criminal investigations, the sources of evidence and information are changing from analog media such as documents to digital media such as computer hard disks.

However, since digital information has the property of being easily deleted, it is difficult to obtain relevant evidence. In such a digital environment, there is need for a method of obtaining information from digital storage media, such as a deleted or formatted hard disk. Here, the corresponding field is referred to as digital forensics.

Meanwhile, a Windows page file (pagefile.sys) used in digital forensics denotes a part of a hard disk used as a memory to expand a physical memory capacity. The page file stores data in units of pages according to a Windows memory management mechanism. Pages stored in the page file do not relate to each other, but one page contains data providing the same function. Information required for managing the page file is stored in the memory upon operation of Windows, and disappears when the system is shut down. Thus, it is impossible to obtain the management information on the stored pages from the page file alone. In other words, in conventional digital forensics, only strings can be extracted from the page file due to lack of available data related to the page file. Consequently, a password, a Uniform Resource Locator (URL) and an email address can be extracted by string searching, but it is impossible to extract further information.

SUMMARY OF THE INVENTION

The present invention is directed to providing a method and apparatus for digital forensics.

The present invention is also directed to providing a method and apparatus for digital forensics that analyze a page file according to features and use appropriate methods for the respective features.

The present invention is also directed to performing digital forensics with no management information except a page file.

One aspect of the present invention provides an apparatus for digital forensics, comprising: a page file extractor for extracting a page file stored in a target storage medium; a stored-page feature extractor for extracting features of pages stored in the extracted page file; a page classifier for comparing the extracted features of the pages with at least one predetermined classification criterion, and classifying the pages according to the comparison results; and a digital forensics unit for performing digital forensics according to the classified pages.

The page file may store virtual memory data in units of pages in a computing environment using a Windows operating system. The features of the pages may correspond to binary data distribution characteristics according to memory addresses in the pages. The classification criterion may be stored in a page feature database. The page file may include a kernel space data storage and a user space data storage, and the user space data storage may include at least one execution section and at least one heap/stack section.

The target storage medium may be a data storage medium capable of saving the stored page file even if power is cut off. The page classifier may classify the pages according to at least one execution section. The pages may be 4 Kbytes in size. The binary data distribution characteristics may be expressed differently according to sections including the pages.

Another aspect of the present invention provides a method for digital forensics, comprising: extracting a page file stored in a target storage medium; extracting features of pages stored in the extracted page file; comparing the extracted features of the pages with at least one predetermined classification criterion, and classifying the pages according to the comparison results; and performing digital forensics according to the classified pages.

The page file may store virtual memory data in a computing environment using a Windows operating system. The features of the pages may correspond to binary data distribution characteristics according to memory addresses in the pages. The method may further comprise storing the classification criterion in a feature database. The storing of the classification criterion in the feature database may comprise: extracting a page file in a normal computing environment; analyzing an address of a memory in the page file corresponding to the extracted page file; analyzing a section of the page file according to the analyzed address of the memory; analyzing a feature of a page included in the analyzed section; and determining the analyzed feature of the page as the classification criterion and storing the classification criterion in the feature database.

The page file may include a kernel space data storage and a user space data storage, and the user space data storage may include at least one execution section and at least one heap/stack section. The target storage medium may be a data storage medium capable of saving the stored page file even if power is cut off.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
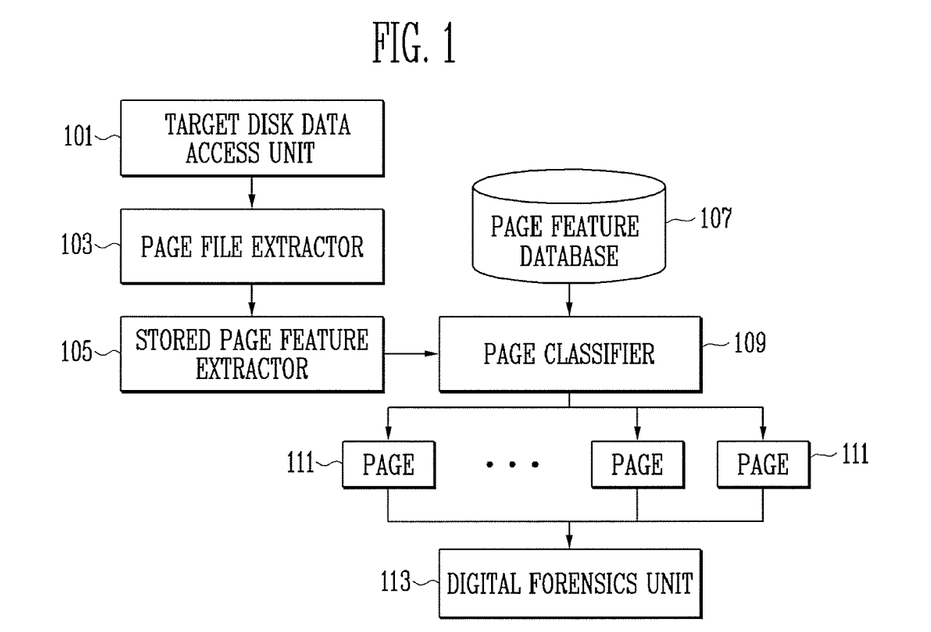
FIG. 1 is a block diagram of an apparatus for digital forensics according to an exemplary embodiment of the present invention.

FIG. 1 is a block diagram of an apparatus for digital forensics according to an exemplary embodiment of the present invention.

Referring to FIG. 1, the apparatus for digital forensics according to an exemplary embodiment of the present invention includes a target disk data access unit 101, a page file extractor 103, a stored-page feature extractor 105, a page feature database 107, a page classifier 109, and a digital forensics unit 113.

The target disk data access unit 101 receives information from a target disk in order to perform digital forensics according to an exemplary embodiment of the present invention. The target disk data access unit 101 may have a shape and characteristics that vary according to the type of a storage medium targeted for digital forensics. For example, when digital forensics is performed on a hard disk of a Personal Computer (PC), which is the most frequently used storage medium, the target disk data access unit 101 may include a socket having a shape capable of connecting to the hard disk and receiving data, a driver program, and so on.

The page file extractor 103 serves to extract a page file from a disk accessed by the target disk data access unit 101. The page file is part of an external storage medium, such as a hard disk drive, used as a memory in a Windows operating system environment. Unlike data in a Random Access Memory (RAM), data stored in the page file remains in tact even if power is cut off. By analyzing the page file, it is possible to know what task a computer targeted for digital forensics performed at a given time. In particular, when a Windows operating system is used, such a page file is identified by the file name "pagefile.sys".

The stored-page feature extractor 105 serves to extract features of pages from the pages stored in the extracted page file. A page is the minimum unit having a size of 4 Kbytes by which data is read from a memory in a Windows operating system environment. Since the memory reads data in units of pages, all data included in the same page may be the same kind.

When an execution file is loaded in a Windows operating system environment, a Portable Executable (PE) file format is used. The PE file format is loaded into a virtual memory, that is, the page file (pagefile.sys). The data loaded into the page file according to the characteristic of the PE file is classified according to its functional characteristics and then stored. In other words, respective pages are stored in different sections having different addresses according to functional characteristics. Pages that are not directly related to each other but perform similar functions in different processes are stored in the same section.

Therefore, the page file is divided into a storage for storing a temporary memory, such as a heap or a stack, and a storage for storing a kernel space and a user space, and the user space is divided again into several sections according to features of respective data. This will be described in detail with reference to FIG. 5. Each section has the same kind of pages, and the binary distribution characteristic of the pages varies according to the type of data storage space. In other words, the distributions of data stored in respective storage spaces differ according to respective sections.

When the respective sections are classified according to the distribution characteristics, it is possible to perform appropriate digital forensics for each section, and information that can be obtained from the page file remarkably increases in comparison with a conventional method. For example, digital forensics regarding process management information can be performed in a section related to program codes, and digital forensics regarding data generated upon program execution can be performed in a section related to data.

The stored-page feature extractor 105 extracts the features of the respective pages to know what characteristics the respective binary data distributions of the pages included in the page file have.

The page feature database 107 stores a classification criterion by which the binary data distributions of distinctive pages are previously extracted from respective sections in a general computing environment. In other words, the page feature database 107 is a component storing classification criterion values for determining what sections the page features extracted by the stored-page feature extractor 105 are included in.

The page classifier 109 serves to compare the feature data extracted by the stored-page feature extractor 105 with the classification criterion stored in the page feature database 109, and classify the pages according to the respective page features.

By classifying the pages according to the features, it is possible to know which specific section the page file included in the target storage medium belongs to. Thus, digital forensics can be performed in different ways according to the classified pages.

Using pages 111 classified by the page classifier 109, the digital forensics unit 113 serves to perform digital forensics according to the page features. By performing digital forensics in this way, it is possible to analyze the environment of a target computer in more detail than a conventional method does.

Figure 2:
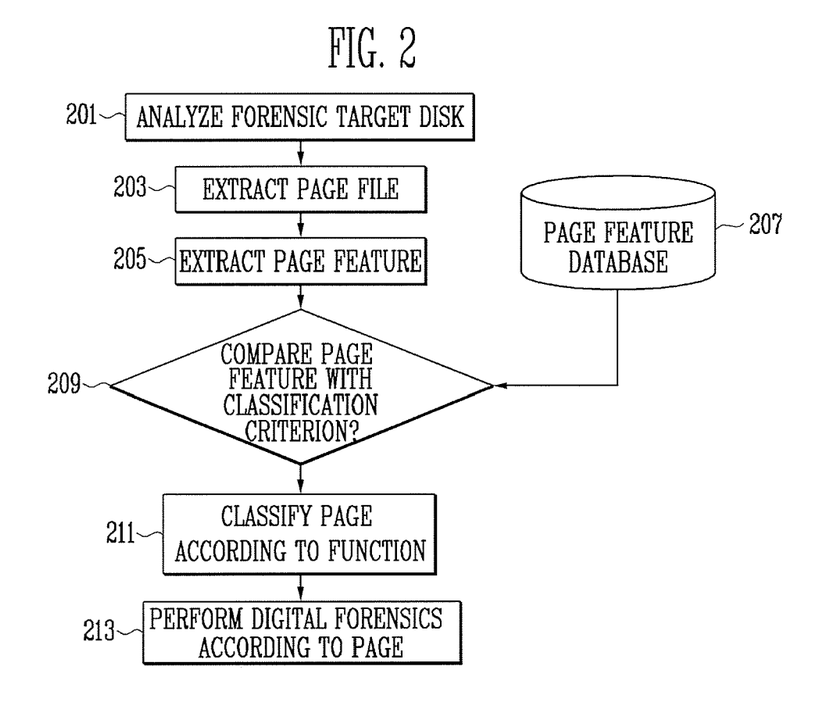
FIG. 2 is a flowchart showing a process of performing digital forensics according to an exemplary embodiment of the present invention.

FIG. 2 is a flowchart showing a process of performing digital forensics according to an exemplary embodiment of the present invention.

Referring to FIG. 2, a disk targeted for forensics is analyzed (step 201). As for a target computer, there are many occasions when it is necessary to ascertain the circumstances surrounding its use at a specific point in time. It is quite probable that a target disk drive does not have accurate information on a program used at that point in time, and information stored in a RAM, etc., disappears when power is cut off. Thus, it is difficult to know the circumstances at the specific time. However, a storage medium such as a hard disk drive saves information even if power is cut off, and thus it is possible to analyze the computing environment at the point in time using the information stored in the hard disk.

To extract such information, a page file is extracted from the target disk (step 203). Then, pages included in the extracted page file are extracted, and features of the pages are extracted (step 205). Since each page stored in a page file stores data having the same feature as described with reference to FIG. 1, the features of data are extracted in units of pages.

Subsequently, the page features of the forensic target disk are compared with an existing classification criterion based on section-specific page features extracted from a general computing environment (step 209). The existing classification criterion based on section-specific page features extracted from a general computing environment is previously stored in a page feature database 207, and become criteria for classifying the page-specific features of the forensic target disk.

The feature data of the pages is compared with the classification criterion stored in the page feature database 207, and thereby the pages extracted from the forensic target disk are classified according to functions using the classification criterion previously stored in the page feature database 207 (step 211). Subsequently, digital forensics is actually performed according to the classified pages (step 213). When digital forensics is performed in this way, it is possible to extract more information than can be obtained by a conventional method.

Figure 3:
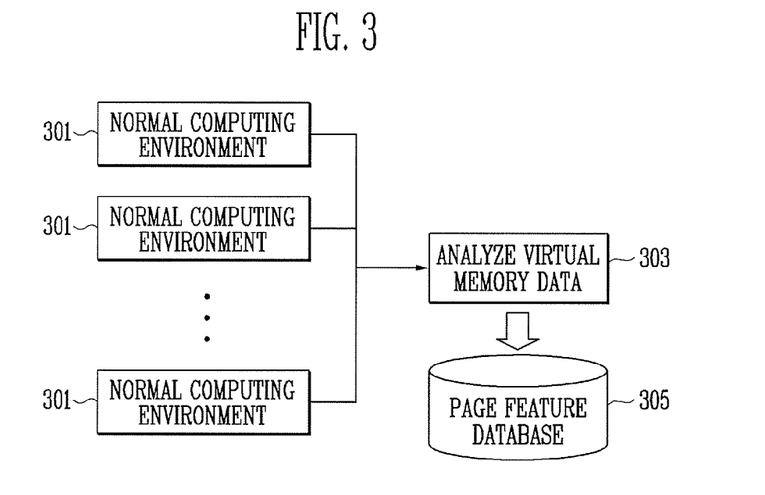
FIG. 3 illustrates a process of constructing a page feature database according to an exemplary embodiment of the present invention.

FIG. 3 illustrates a process of constructing a page feature database according to an exemplary embodiment of the present invention.

Referring to FIG. 3, As described above, a page file generated in a normal computing environment 301 is analyzed 303, and the data feature of the page file generated when a specific process is performed is analyzed and stored in a page feature database 305.

In a normal computing environment, an actually performed process can be observed, and thus it is possible to apparently know the data distribution characteristics of a page belonging to a specific section and characteristics of the section. In this way, all the data distribution characteristics of section-specific pages are classified and stored in the page feature database 305.

Figure 4:
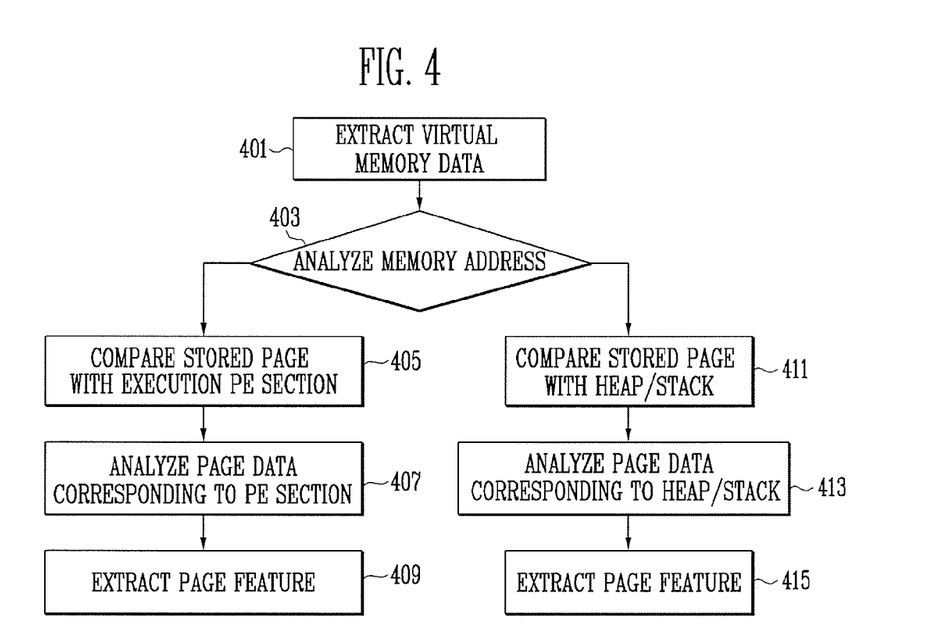
FIG. 4 illustrates a process of extracting a feature of a target page.

FIG. 4 illustrates a process of extracting a feature of a target page.

Referring to FIG. 4, a page file is extracted from a storage medium (step 401). Then, the memory addresses of respective sections included in the page file are analyzed (step 403). In the PE file format stored in a page file, features of stored data differ according to memory addresses, and respective data features are classified into several sections. This will be described in detail with reference to FIG. 5. Page data that are not directly related to each other but have the same characteristics are stored in the same section. Therefore, the memory addresses are analyzed to classify the respective sections, and the data distribution characteristics of each section are detected.

A page file may be roughly divided into a temporary storage memory, such as a heap or a stack, and function-specific section spaces in a user space. Thus, by analyzing the memory addresses, the page file is first divided into a section part for the PE file format and a heap/stack part. Then, in the PE section part, pages stored in the page file of the disk and a PE section including the data is checked (step 405). In other words, a relationship between the features of the pages and the PE section including the pages is checked.

Subsequently, a common feature of the page data included in the PE section is analyzed (step 407) and extracted as the page feature of the PE section (step 409).

Meanwhile, when the heap/stack part is analyzed after analyzing the memory addresses, almost the same process is performed. The heap/stack part has different data features from respective PE sections, and thus is separately processed from the beginning. In other words, in the same way as in the PE section part, pages stored in the disk and a heap/stack including the pages are checked (step 411). Subsequently, a common feature of page data included in the heap/stack is analyzed (step 413) and extracted as the page feature of the heap/stack (step 415).

Figure 5:
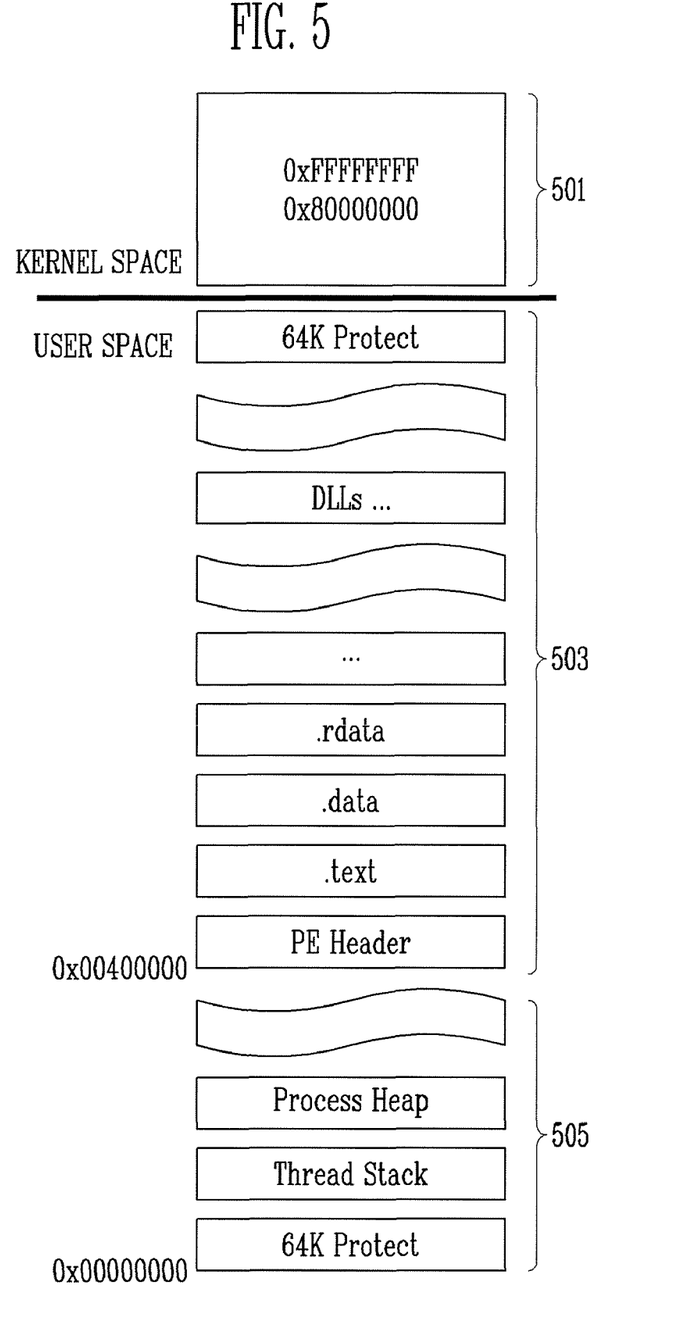
FIG. 5 illustrates the constitution of a page file employed in the present invention.

FIG. 5 illustrates the constitution of a page file employed in the present invention.

Referring to FIG. 5, the constitution of a page file used as a virtual memory in a Windows environment to which the present invention is applied is illustrated according to addresses. The page file is roughly divided into a kernel data storage space 501, a user data storage space 503, and a heap/stack space 505. The kernel data storage space 501 stores kernel data that an operating system must have, and does not have much to do with an execution process or data. User data is included in the user data storage space 503 and the heap/stack space 505. Here, the user data storage space 503 is divided into several functional sections. When a process is loaded into a page file in a Windows environment, the PE file format is used. The PE file format is divided into sections including the same type of data. In addition, data included in such a section is stored in units of 4 Kbytes in size, which are referred to as pages. Such pages are the minimum units in which data is loaded into a memory.

In other words, each section of the user data storage space 503 consists of several pages, and each page in a section may not relate to the others in any way except that it stores data having the same functional characteristics as they do.

In addition, the heap/stack space 505 temporarily stores data required in real time when a process is performed in a Windows environment. In other words, while a process is performed in a page file used as virtual memory, the heap/stack space 505 stores temporary data required for changing data in real time, and so on.

In the user data storage space 503 and the heap/stack space 505 of the page file, data is recorded in sequence in the address of the page file according to a process time order. Thus, when the characteristics of the sections according to respective data features are obtained, it is possible to obtain much information on a computing environment at a specific time.

Figure 6:
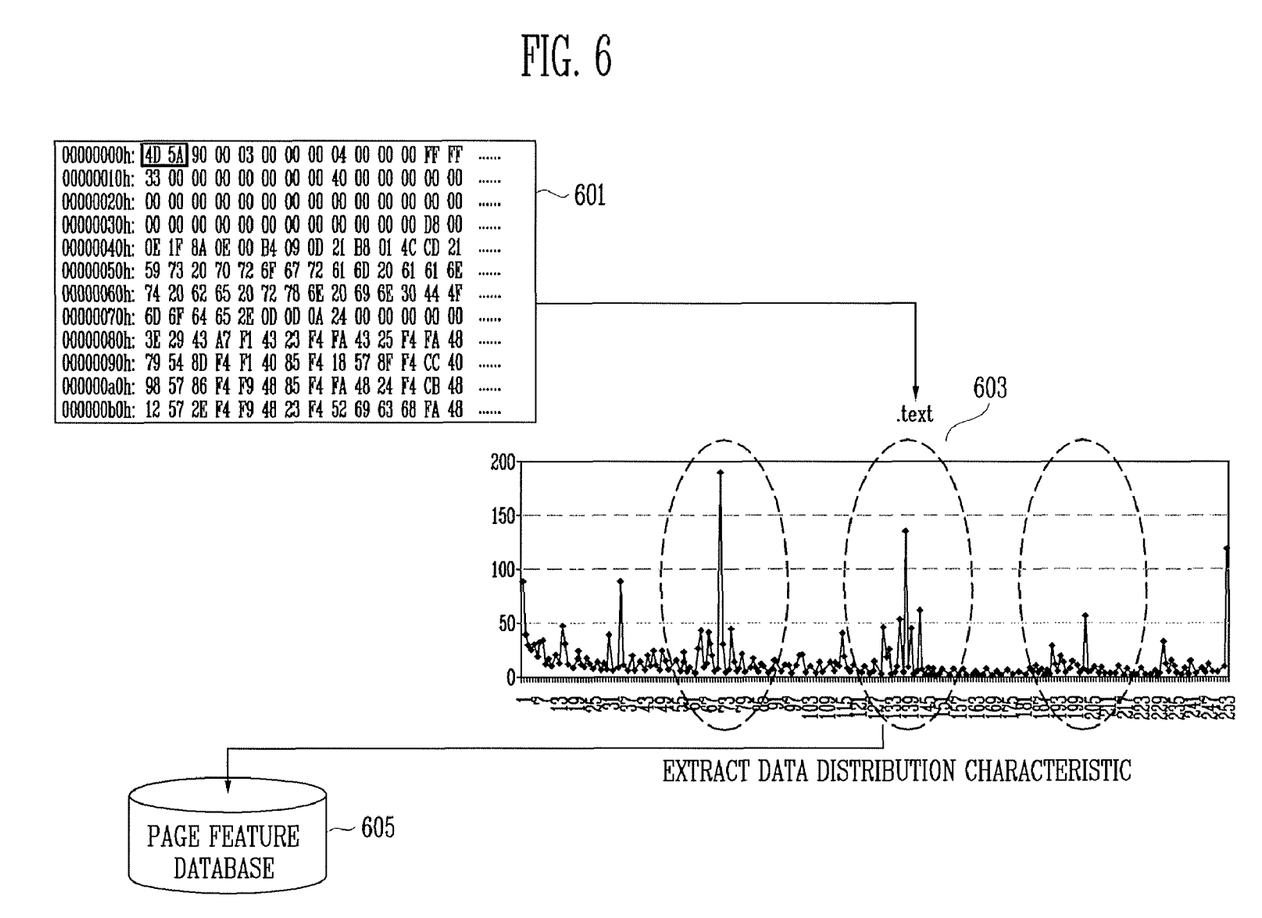
FIG. 6 illustrates an example of extracting a page feature according to an exemplary embodiment of the present invention.

FIG. 6 illustrates an example of extracting a page feature according to an exemplary embodiment of the present invention.

Referring to FIG. 6, a method of extracting a page feature using a binary data distribution characteristic is illustrated. Reference numeral 601 shows the data code of a page included in a ".text" section of a page file. The page data code appearing to have no meaning is calculated in a binary format according to addresses, and the number of "1"s included in the respective addresses, i.e., the distribution of the data, is represented in a graph. Here, all data of pages included in the same type of section have similar distribution characteristics. As indicated by reference numeral 603, a data distribution with three ridges may be characteristic of the ".text" section.

In this way, page feature data is extracted using data distribution characteristics and stored in a page feature database 605.

Figure 7:
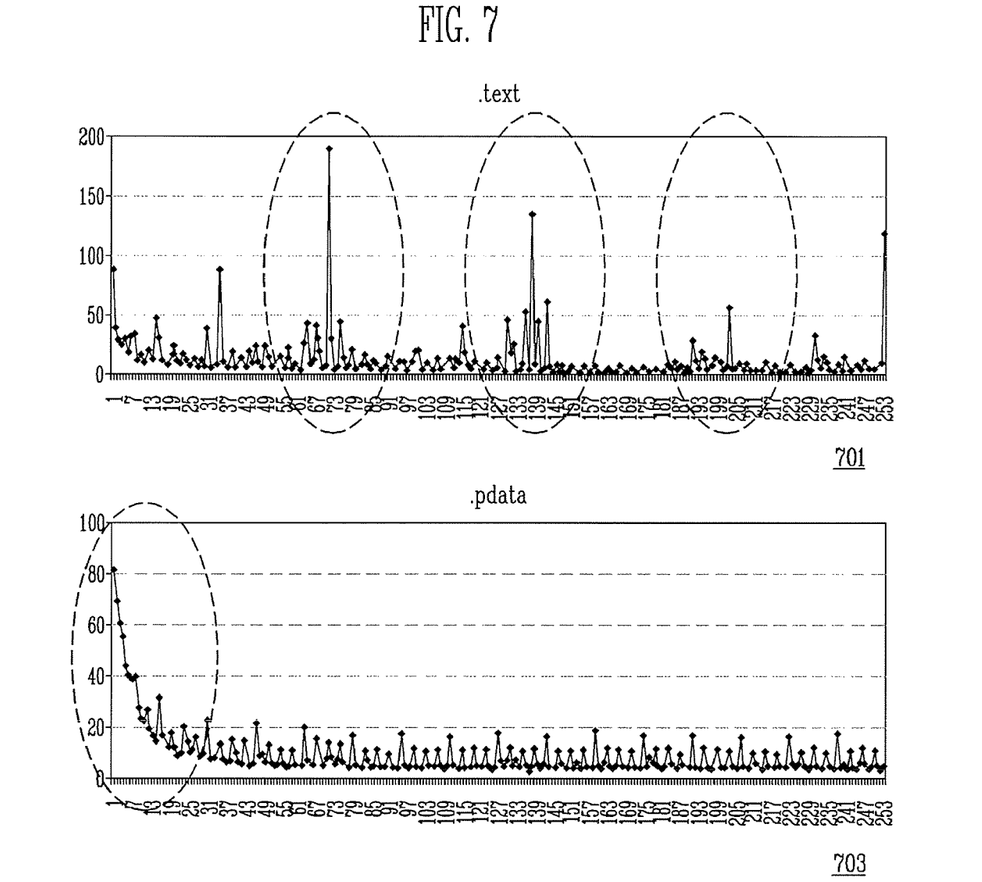
FIG. 7 illustrates examples of data distribution characteristics.

FIG. 7 illustrates examples of data distribution characteristics.

Referring to FIG. 7, graphs show the data distribution characteristics of two typical function-specific sections.

A graph 701 shows the distribution characteristics of page data of the ".text" section. The horizontal axis of the graph 701 represents the address of a page, and the vertical axis represents the number of "1"s included in each address, i.e., the degree of distribution of data.

Referring to the graph 701, the ".text" section has three large ridges. More specifically, the ".text" section has the largest data distribution degree of 150 or more around an address of 70 hex, a data distribution degree of 100 or more around an address of 140 hex, and a data distribution degree of 50 or more around an address of 200 hex.

On the other hand, a graph 703 shows the distribution characteristics of page data of a ".pdata" section. In comparison with the graph 701, it is apparent that the graph 703 has different data distribution characteristics. More specifically, the ".pdata" section has the greatest data distribution degree at addresses of 40 hex or less and almost uniform and small data distribution degrees at other addresses.

When pages are analyzed in this way, data distribution characteristics can be checked according to respective sections, and it is possible to check in which sections the respective pages are included using the data distribution characteristics.

The present invention can provide a method and apparatus for digital forensics.

In addition, the present invention can provide a method and apparatus for digital forensics that analyze page files according to features and use appropriate methods for the respective features.

Furthermore, the present invention can perform digital forensics with no management information except a page file While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for digital forensics, comprising:
a page file extractor for extracting a page file stored in a target storage medium;
a stored-page feature extractor for extracting features of pages stored in the extracted page file;
a page classifier for comparing the extracted features of the pages with at least one predetermined classification criterion, and classifying the pages according to the comparison results; and
a digital forensics unit for performing digital forensics according to the classified pages,
wherein the features of the pages correspond to binary data distribution characteristics according to memory addresses in the pages.

2. The apparatus of claim 1, wherein the page file stores virtual memory data in units of pages in a computing environment using a Windows operating system.

3. The apparatus of claim 1, wherein the classification criterion is stored in a page feature database.

4. The apparatus of claim 1, wherein the page file includes a kernel space data storage and a user space data storage, and the user space data storage includes at least one execution section and at least one heap/stack section.

5. The apparatus of claim 1, wherein the target storage medium is a data storage medium capable of saving the stored page file even if power is cut off.

6. The apparatus of claim 1, wherein the page classifier classifies the pages according to at least one execution section.

7. The apparatus of claim 1, wherein the pages are 4 Kbytes in size.

8. The apparatus of claim 1, wherein the binary data distribution characteristics are expressed differently according to sections including the pages.

9. A method for digital forensics, comprising:
extracting a page file stored in a target storage medium;
extracting features of pages stored in the extracted page file;
comparing the extracted features of the pages with at least one predetermined classification criterion, and classifying the pages according to the comparison results; and
performing digital forensics according to the classified pages,
wherein the features of the pages correspond to binary data distribution characteristics according to memory addresses in the pages.

10. The method of claim 9, wherein the page file stores virtual memory data in units of pages in a computing environment using a Windows operating system.

11. The method of claim 9, further comprising:
storing the classification criterion in a feature database.

12. The method of claim 11, wherein the storing of the classification criterion in the feature database comprises:
extracting a page file in a normal computing environment;
analyzing an address of a memory in the page file corresponding to the extracted page file;
analyzing a section of the page file according to the analyzed address of the memory;
analyzing a feature of a page included in the analyzed section; and
determining the analyzed feature of the page as the classification criterion and storing the classification criterion in the feature database.

13. The method of claim 9, wherein the page file includes a kernel space data storage and a user space data storage, and the user space data storage includes at least one execution section and at least one heap/stack section.

14. The method of claim 9, wherein the target storage medium is a data storage medium capable of saving the stored page file even if power is cut off.

15. An apparatus for digital forensics, comprising:
a page file extractor for extracting a page file stored in a target storage medium;
a stored-page feature extractor for extracting a plurality of different features of pages stored in the extracted page file;
a page classifier for comparing the extracted plurality of different features of the pages with at least one predetermined classification criterion, and classifying the pages according to the comparison results; and
a digital forensics unit for performing digital forensics according to the classified pages,
wherein the plurality of different features of the pages are configured to be displayed on a graph according to binary data distribution characteristics for each of the plurality of different features in the pages.

* * * * *